Feb. 27, 1962 J. M. COCHRAN ETAL 3,023,352
ELECTRIC DRIVE
Filed June 9, 1960
4 Sheets-Sheet 1
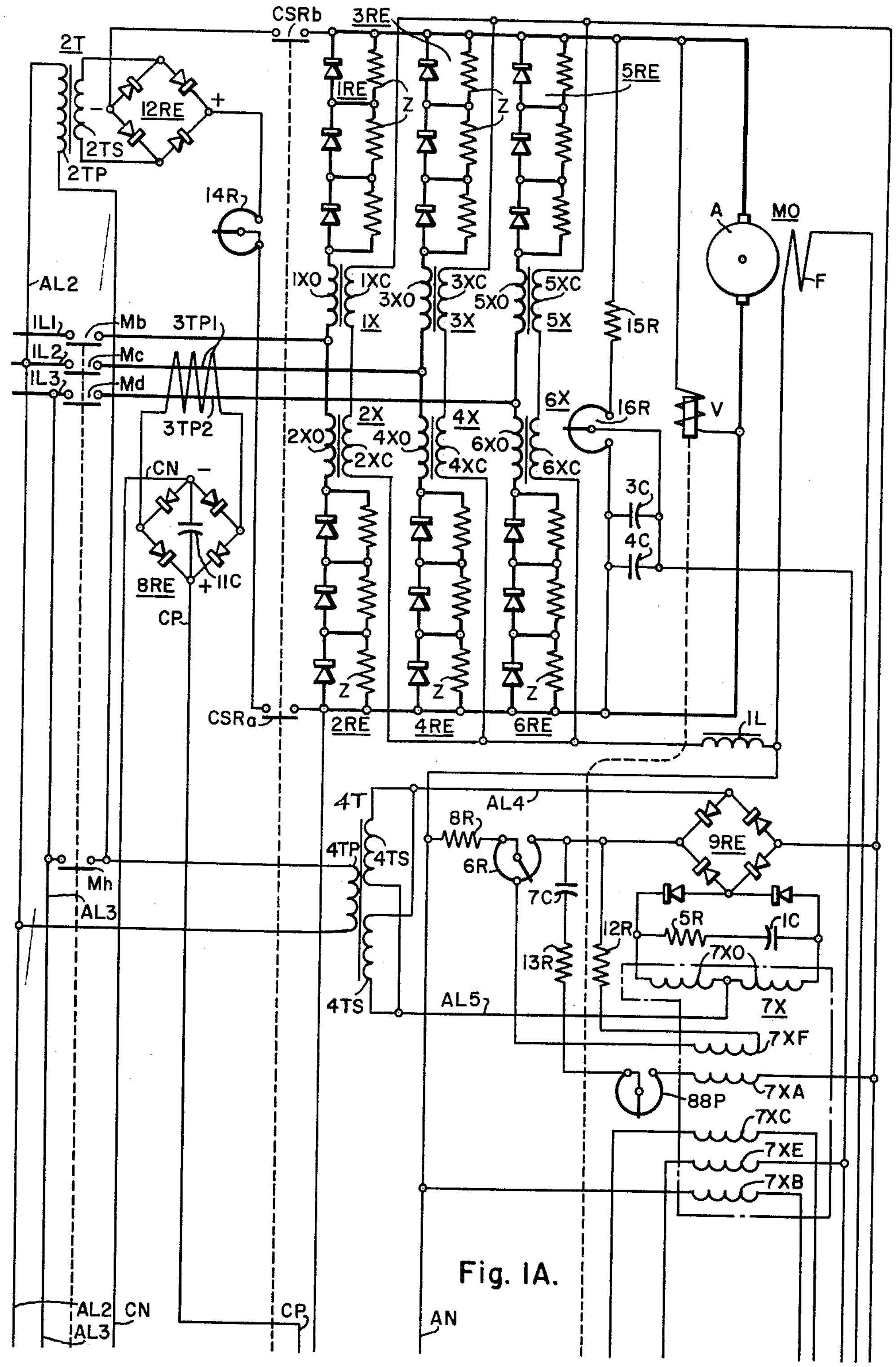
Fig. IA.

ELECTRIC DRIVE

Filed June 9, 1960

ELECTRIC DRIVE

Filed June 9, 1960 4 Sheets-Sheet 3

ELECTRIC DRIVE

Filed June 9, 1960

United States Patent Office 3,023,352
Patented Feb. 27, 1962

3,023,352

ELECTRIC DRIVE

John M. Cochran, Williamsville, Harlan L. Seelhoff, Tonawanda, and Frank H. Banks, Depew, N.Y., assignors to Westinghouse Electric Corporation, East Pittsburgh, Pa., a corporation of Pennsylvania Filed June 9, 1960, Ser. No. 34,944
3 Claims. (Cl. 318—513)

This invention relates to the art of electrical drives, and has particular relationship to drives for such industrial facilities as paper mills, steel mills and the like. One of the important demands imposed on such drives is that the speed be variable over a wide range. It is necessary that the drive be operated at a very low speed which will be referred to herein as creep speed, during such operations as threading or jogging while during normal running operations it is necessary that the drive be operated at a very high speed. In some installations it is required that the creep speed be as low as one-fortieth (1/40) of the base speed.

It is broadly an object of this invention to provide an industrial drive which shall be readily variable over a wide range of speeds.

An industrial drive of the type just described may include a direct current motor which is supplied from an alternating current supply through saturable reactors and rectifiers which are connected in controlling and rectifying relationships between an alternating current power supply and the direct current motor. In operating drives of this type in accordance with the teachings of the prior art, it has been found that the wide range of speeds demanded in industries such as the paper making industry and the steel industry could not be obtained.

It is then a specific object of this invention to provide a drive in which a motor is controlled from saturable reactors, and the speed of which shall be variable or adjustable over a wide range permitting the motor to be operated at creep speeds that are as low as one-fortieth of the base speed of the motor.

This invention arises from the discovery that the minimum speed of the range is limited by the magnetizing current which flows from the output windings of the reactors through the motor when the reactors are set for maximum reactance. In practice this magnetizing current is usually so high as to limit the creep speed to about one-eighth of the base speed. In accordance with this invention the magnetizing current is suppressed in the motor by counter current impressed on the motor. It has been found that with this apparatus so set the creep speed may be very small compared to the base speed. The counter current is derived from an auxiliary supply connected across the motor through a resistance (or reactance where ripple is to be suppressed). The voltage of this supply may be high or low; if this voltage is high the resistance (or reactance) must be high; if the voltage is low the resistance (or reactance) may be low. When the voltage is low the auxiliary supply must be disconnected during normal operation to prevent the back E.M.F. of the motor from causing current to flow through the low resistance or reactance. The low suppression voltage and low resistance are included in situations in which the creep speed facility is used as a facility separately from the running facilities of the drive and the speed range of the drive starts with a speed substantially higher than the creep speed. For example, the speed may vary of a range of eight to one (lowest operating speed one-eighth-base speed) and the creep speed may be one-fortieth of base speed. The high suppression voltage and high resistance are included when the speed range of the motor extends from creep speed to base speed, that is, is forty to one.

The novel features considered characteristic of this invention are disclosed generally above. This invention itself, both to its organization and as to its method of operation together with additional objects and advantages thereof, will be understood from the following description of a specific embodiment taken in connection with the accompanying drawings in which:

FIGURE 1 is a schematic showing a preferred embodiment of this invention; and,

Figures 1B, 3:
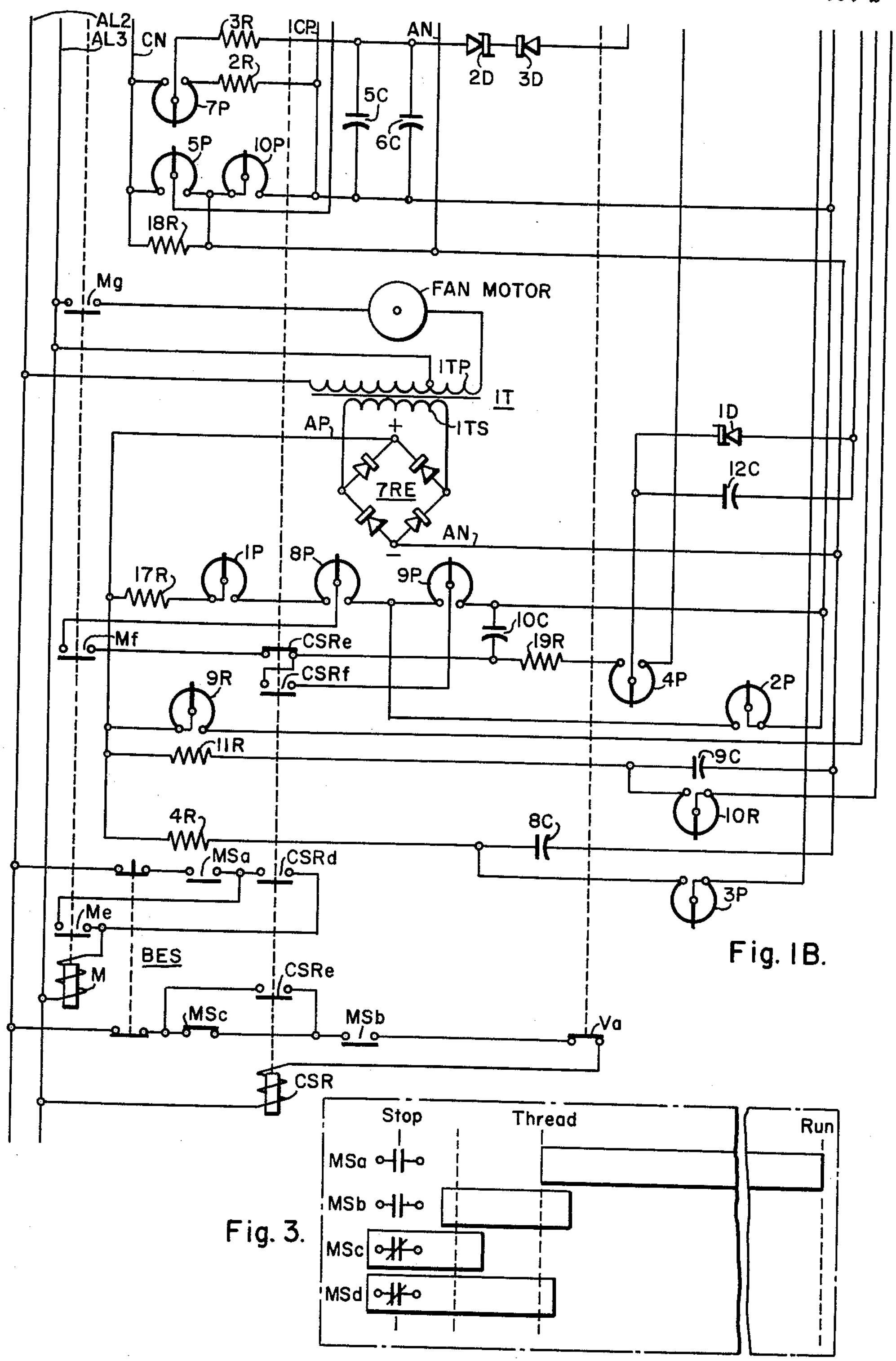
FIG. 3 is a schematic of the master switch.
Figure 2A:
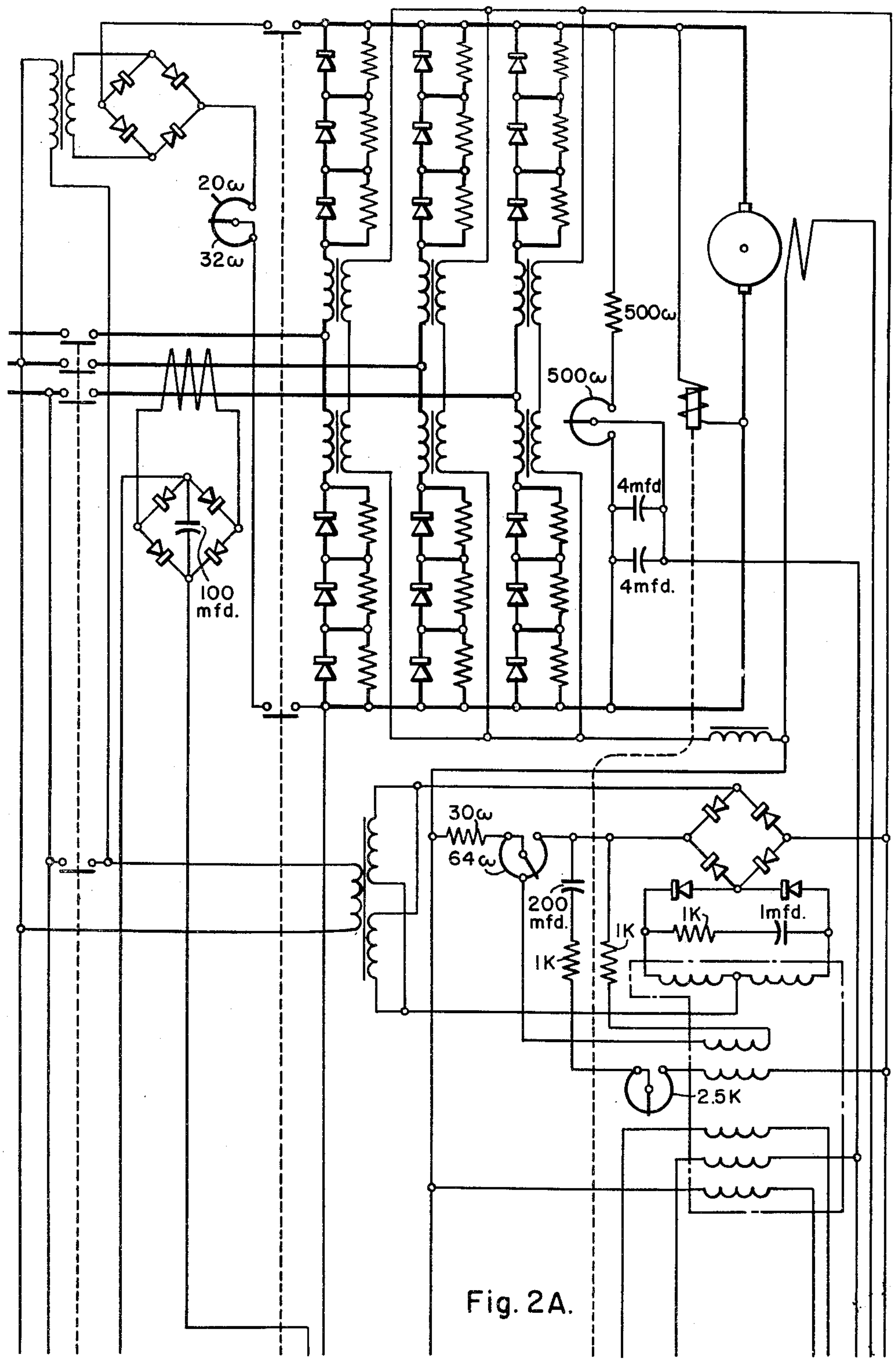
FIG. 2 is a schematic similar to FIG. 1 but showing the magnitudes and designations of components included in apparatus which has been constructed and found to operate satisfactorily.
Figure 2B:
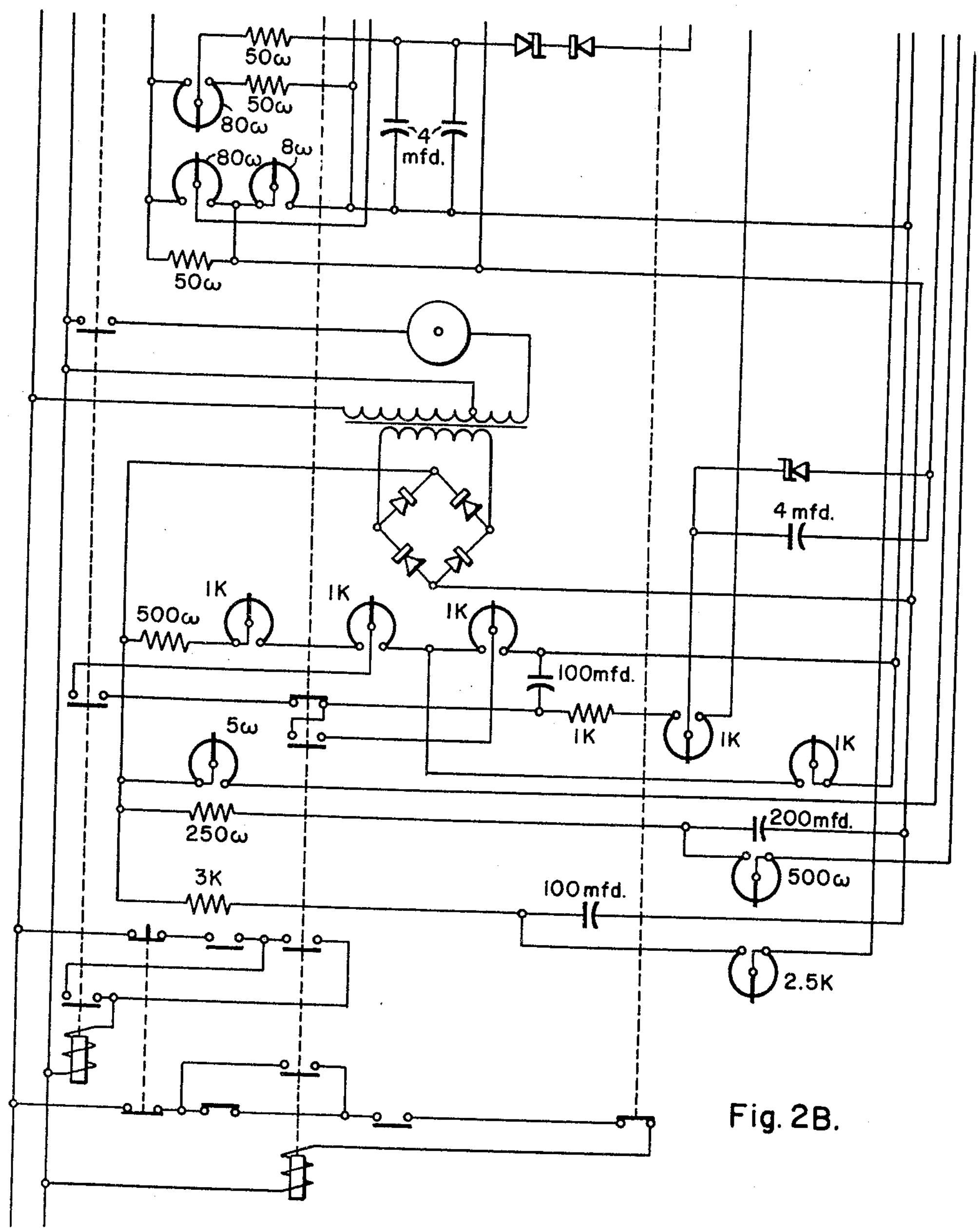

The apparatus shown in the drawings includes a Drive, a Power Supply Unit and a Control Unit. This subdivision of the apparatus is on a functional and not on a structural basis. The various parts of the apparatus may be assembled structurally in any convenient manner independently of the above subdivision. This apparatus is supplied with power from the conductors 1L1, 1L2, and 1L3 which are adapted to be connected to the busses of a commercial three-phase power supply through the usual disconnects or circuit breakers (not shown). Power for control purposes is derived from the conductors AL2 and AL3 which are connected directly to the conductors 1L2 and 1L3. The conductors AL2 and AL3 supply the primaries 2TP and 4TP of the transformers 2T and 4T through an auxiliary contact M*h* of main contactor M. Conductors AL2 and AL3 also supply the primary 1TP of a transformer 1T. Transformer 1T has a secondary 1TS which supplies conductors AP and AN through rectifier 7RE. These conductors serve for various control purposes. Transformer 2T has a secondary 2TS which supplies rectifier 12RE which serves to balance out the magnetizing current. Transformer 4T has a secondary 4TS which supplies the conductors AL4 and AL5 of the Power Supply Unit.

The Drive includes a motor MO having an armature A and a shunt field F. The field F is supplied from the conductors AP and AN through a variable resistor 9R. A voltage responsive relay V is connected across the armature A. This relay V is actuated when the voltage across the armature A reaches a magnitude corresponding to a speed appreciably higher than creep speed. The relay V has a back contact V*a* which is connected in the control unit. Fixed resistor 15R and variable resistor 16R are connected across armature A. Voltage proportional to the armature voltage for controlling and regulating purposes is derivable from 16R. Smoothing capacitor 3C and 4C are connected between the adjusting arm of 16R and one of its terminals.

The Power Supply Unit includes a plurality of reactors 1X, 2X, 3X, 4X, 5X and 6X. Each reactor has a control winding 1XC through 6XC and an output winding 1XO through 6XO. The Power Supply Unit also includes a plurality of rectifiers or diodes 1RE through 6RE which are of the silicon type. The output windings 1XO through 6XO are adapted to be connected in series with a corresponding rectifier 1RE through 6RE respectively, in controlling relationship between the conductors 1L1, 1L2 and 1L3 and the armature A of the motor M through the front contacts M*b*, M*c*, M*d* of the main contactor M. Conductor 1L1 is adapted to be connected directly to one of the terminals each of 1XO and 2XO through M*b*. Conductor 1L2 is adapted to be connected to a common terminal of 3XO and 4XO through M*c* and the primary 3TP of a current transformer 3T; and conductor 1L3 is similarly adapted to be connected to a common terminal of 5XO and 6XO through contact M*d* and another primary 3TP2 of the current transformer 3T. The secondary 3TS of the current transformer 3T supplies potential dependent on the loading of the motor M to controlling conductors CN and CP in the Control Unit. Protective resistors Z are connected across the rectifiers 1RE through 6RE.

The Power Supply Unit also includes a magnetic amplifier 7X. This amplifier includes error winding 7XE, bias winding 7XB, current limit winding 7XC, anti-hunting winding 7XA, feedback winding 7XF and output windings 7XO. The output windings 7XO are supplied from conductors AL4 and AL5 and are connected through the rectifiers 9RE and 10RE in the usual self-saturating circuit to supply controlling ampere turns to the respective control windings 1XC through 6XC of the reactors 1X through 6X. The control current flows from the positive terminal of 9RE through a variable resistor 6R, a fixed resistor 8R, an inductance 1L, the windings 1XC and 2XC and 3XC and 4XC and 5XC and 6XC connected in parallel to the negative terminal of 9RE. The pairs of series connected control windings 1XC and 2XC, 3XC and 4XC, 5XC and 6XC are supplied with biasing ampere currents from the conductors AP and AN through a fixed resistor 11R, a variable resistor 10R and the inductor 1L. The biasing ampere turns are of opposite polarity to the ampere turns supplied from the output windings 7XO of the magnetic amplifier 7X.

With the contacts M*b*, M*c* and M*d* closed, and the controlling windings 1XC through 6XC set so that the reactors 1X through 6X have the maximum impedance magnetizing would circulate through the motor M. For example, such current would flow from conductor 1L1 through winding 1XO, rectifiers 1RE, the armature A, rectifiers 4RE, winding 4XO to 1L2 when the potential between 1L1 and 1L2 is a maximum. Like current would flow between the other pairs of conductors. To suppress this magnetizing current which has been found to limit the minimum speed at which the motor M can operate, the rectifier 12RE is adapted to be connected between the terminals of the armature A through a variable resistor 14R and the contacts CSR*a* and CSR*b* of the creep speed relay CSR in the Control Unit. The rectifier 12RE is so poled as to counteract the magnetizing current in the armature A.

The Control Unit includes a master switch DM. The switch DM has normally opened contacts MS*a* and MS*b* and normally closed contact MS*c*. Contact MS*a* is closed during normal running; contact MS*b* is closed during creep speed operation for threading, for example, and the other contact MS*c* is opened in the "run" setting.

The coil of contactor M is adapted to be connected between conductors AL2 and AL3 through the normally closed contact of an emergency-stop push button BES, contact MS*a* and contact CSR*d* of the creep speed relay CSR. The coil of contactor M is locked in through auxiliary contact M*e*. The coil of the creep speed relay CSR is adapted to be connected between conductors AL2 and AL3 through the normally closed contact of emergency push button BES, normally closed contact MS*c*, normally opened contact MS*b*, and back contact V*a*. The coil of CSR is adapted to be locked in through the front contact CSR*c*. When the voltage for which the voltage relay V is actuated appears across the armature A, contact V*a* opens and creep speed relay CSR drops out.

The Control Unit includes a potentiometer 8P for setting the running speed of the motor MO and a potentiometer 9P for setting the creep speed. There is also a variable resistor 1P for setting the maximum speed at which the motor MO can operate and a potentiometer 2P for setting the minimum speed. These components derive their potential from the conductors AP and AN and are connected to control the current through the error winding 7XE of the magnetic amplifier 7X. The main speed control circuit extends from the adjustable arm of the potentiometer 8P through front auxiliary contact M*f* of contactor M, back contact CSR*e* of the creep speed relay CSR, resistor 19R, potentiometer 4P which may be set to limit the error signal, the winding 7XE, resistor 16R, potentiometer 5P which is set to determine the IR drop compensation, variable resistor 10P which must be set for maximum speed, potentiometers 2P and 9P in parallel to potentiometer 8P. The IR drop compensation potentiometer 5P and resistor 10P are connected to be supplied from the conductors CN and CP and thus introduce a signal into the error winding 7XP dependent on the loading on the motor M.

During creep speed operation the contact CSR*f* is closed and contact M*f* is opened. Under such circumstances, the error signal is derived from potentiometer 9P and extends from the adjustable arm of 9P through CSR*f*, resistor 19R, error limit potentiometer 4P, error winding 7XE, variable resistor 16R, potentiometer 5P, variable resistor 10P to the potentiometer 9P.

The error signal is limited by a Zener diode 1D which is connected between the adjustable arm of 16R and the adjustable arm of 4P. A capacitor is connected across the diode 1D. When the error signal becomes excessively large, the capacitor 12C is charged with its plate connected to the arm of 4P positive and the other plate negative to a potential such that 1D breaks down. The current flow through the winding 7XE is now limited by the diode 1D which conducts current continuously through 4P, the diode and the error winding 7XE.

The bias winding 7XB of 7X is supplied with ampere turns from conductors AP and AN in a circuit extending from 4R through a variable resistor 3P, bias windings 7XB to conductor AN. The current-limit winding 7XC is adapted to be supplied from the current limit potentiometer 7P which is between the current conductors CN and CP through resistor 2R. The current limit circuit extends from the adjustable arm of potentiometer 7P through resistor 3R, Zener diode 2D, a silicon diode 3D, the winding 7XE to the conductor CP. No current is transmitted through this circuit until the potential build-up on 5C and 6C becomes so high that the Zener diode 2D breaks down. Positive current then flows through the winding 7XC, the diode 3D and the Zener diode 2D and this current prevents the output of the magnetic amplifier 7X from increasing beyond the point at which 2D breaks down.

The anti-hunt windings 7XA is supplied from the potential across the rectifier 9RE through capacitor 7C, resistor 13R and variable resistor 33P. This signal is dependent on the rate of change of the potential across the rectifier 9RE. The feedback winding 7XF is supplied from potential across variable resistor 6R through resistor 12R. This potential is dependent on the current supplied to the control winding 1XC through 6XC.

In the standby condition of the apparatus, power is supplied to the conductors 1L1, 1L2 and 1L3, AL2 and AL3, the master switch DM is in the Stop position and contacts MS*a*, MS*b* are open while MS*c* is closed. Contactor M is deenergized at MS*a* and the relay CSR is deenergized at MS*b*. The contacts M*b*, M*c* and M*d* are then open and there is no current through the output windings 1XO through 6XO. There is then no current through the armature A of the motor MO. Transformer 1P is energized and there is potential between AP and AN but the potentiometers 8P and 9P are disconnected from the error signal winding 7XE at M*f* and CSR*f*. Transformer 4P is deenergized at open contact M*h* so that there is no current through the output windings 7XO. Transformer 2T is deenergized at contact M*h* and there is no potential across the output of rectifier 12R. Transformer 3T is deenergized so that there is no potential between CN and CP. Since there is potential between AP and AN, the windings 1XC through 6XC and the biasing winding 7XB are supplied with biasing ampere turns. The magnetic amplifier 7X and the reactors 1X through 6X are then both biased so that their output is a minimum.

To operate the drive and creep speed, the master switch DM is moved to a position such that both MS*b* and MS*c* are closed but MS*a* remains open. CSR is then actuated and locked in through CSR*c*. CSR*a* and CSR*b* are then closed and the magnetizing current suppressing potential is impressed across the armature A. CSR*e* is opened. CSR*f* is closed connecting the potentiometer 9P in the error circuit and preparing the drive to operate at creep speed. CSR*d* is closed but the circuit through contactor M remains open at MS*a*. The master switch is now moved to the Thread position at which MS*b* and MS*a* are both closed and MS*c* is opened. The circuit through CSR remains closed because of the lock-in contact CSR*c*. Contactor M is now actuated closing contacts M*b*, M*c* and M*d* and magnetizing current now flows through the output windings 1XO through 6XO, but the flow of this current through the armature A is suppressed by the counter current from the rectifier 12R. M*a* closes but 8P remains disconnected from the error winding 7X*e* at CSR*e*. Depending on the setting of 9P, the current through the armature A now increases until the potential derivable from 9P is counteracted by the potential derivable from 16R and from 5P. When the load on the motor MO is small, the potential from 9P is balanced only against 16R. The magnetizing current has no effect because of the counteraction of 12R and the speed of the motor MO is determined only by the setting of 9P and may be very low.

When the threading operation or any like creep speed operation is completed, the master switch DM is advanced to the Run position. At this point, MS*b* is opened, MS*c* remains open and MS*a* remains closed. The opening of MS*b* deenergizes CSR, CSR*f* reopens and CSR*e* recloses. The opening of CSR*f* disconnects 9P from the error circuit. Since M*f* is at this point closed, the reclosing of CSR*e* connects the potentiometer 8P, the main speed potentiometer into the error circuit. The motor is now controlled in accordance with the setting of 8P.

The deenergization of CSR also drops out, CSR*a* and CSR*b* disconnecting the rectifier 12RE and the resistor 14R from the motor circuit. The flow of current under the counter E.M.F. of the armature A through 14R and 12R is thus prevented. In situations in which the resistor 14R is very high, this disconnection is not necessary. The current through the motor MO is limited by the break down of 2D and excessive error signal is suppressed by the break down of 1D.

While a preferred embodiment of this invention has been disclosed herein, many modifications thereof are feasible. This invention then is not to be restricted except insofar as is necessitated by the spirit of the prior art.

We claim as our invention:

1. A drive to be energized from an alternating current supply and including a motor, saturable reactor means having output winding means, means connecting said supply in power supply relationship with said motor through said winding means with said winding means in power controlling relationship to said motor, means connected to said winding means, when actuated, for setting said winding means to operate said motor at creep speeds, auxiliary power supply means, and means connected to said setting means and to said motor and operable only so long as said setting means remains actuated for connecting said auxiliary supply means across said motor to suppress the circulation of the magnetizing current from said winding means through said motor.

2. A drive to be energized from an alternating current supply and including a motor, saturable reactor means having output winding means, means connecting said supply in power supply relationship with said motor through said winding means with said winding means in power controlling relationship to said motor, means connected to said winding means, when actuated, for setting said winding means to operate said motor at creep speeds, means connected to said setting means and responsive to the voltage across said motor for interrupting the actuation of said setting means when said voltage is higher than a predetermined magnitude, auxiliary power supply means, and means connected to said setting means and to said motor and operable only so long as said setting means remains actuated for connecting said auxiliary supply means across said motor to suppress the circulation of the magnetizing current from said winding means through said motor.

3. In combination, a motor, a saturable reactor having output winding means, means connecting said output winding means in controlling relationship with said motor, auxiliary power supply means, and means connecting said supply means across said motor with said supply means poled and set to suppress the flow of magnetizing current from said output winding means through said motor.

No references cited.